United States Patent
Ichiki et al.

(10) Patent No.: US 11,387,768 B2
(45) Date of Patent: *Jul. 12, 2022

(54) DIRECT-CURRENT POWER SUPPLY DEVICE, MOTOR DRIVE DEVICE, BLOWER, COMPRESSOR, AND AIR CONDITIONER

(71) Applicant: Mitsubishi Electric Corporation, Tokyo (JP)

(72) Inventors: Satoru Ichiki, Tokyo (JP); Takuya Shimomugi, Tokyo (JP); Koichi Arisawa, Tokyo (JP); Keisuke Uemura, Tokyo (JP); Kenji Iwazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/271,234

(22) PCT Filed: Sep. 28, 2018

(86) PCT No.: PCT/JP2018/036607
§ 371 (c)(1),
(2) Date: Feb. 25, 2021

(87) PCT Pub. No.: WO2020/066030
PCT Pub. Date: Apr. 2, 2020

(65) Prior Publication Data
US 2021/0328538 A1   Oct. 21, 2021

(51) Int. Cl.
*H02P 6/28*    (2016.01)
*H02P 6/24*    (2006.01)
(Continued)

(52) U.S. Cl.
CPC ......... *H02P 29/027* (2013.01); *F25B 31/026* (2013.01)

(58) Field of Classification Search
CPC ......... H02P 29/027; H02P 6/28; H02P 6/085; H02P 6/24; F25B 31/02; F25B 31/026
See application file for complete search history.

(56) References Cited

U.S. PATENT DOCUMENTS

2004/0075423 A1 * 4/2004 Itabashi ............... H02M 3/156
                                                          323/282
2008/0296898 A1 * 12/2008 Ichinose ............. H02P 29/0241
                                                           290/44
(Continued)

FOREIGN PATENT DOCUMENTS

EP   2075907 A1 *  7/2009  ............. B60L 3/003
EP   2 157 684 A1   2/2010
(Continued)

OTHER PUBLICATIONS

International Search Report of the International Searching Authority dated Dec. 11, 2018 for the corresponding international application No. PCT/JP2018/036607 (and English translation).

*Primary Examiner* — Thai T Dinh
(74) *Attorney, Agent, or Firm* — Posz Law Group, PLC (57) ABSTRACT

A direct-current power supply device includes a reactor, a bridge circuit that converts alternating-current voltage output from an alternating-current power supply, which is connected to the reactor, into direct-current voltage, a capacitor that smoothes the output voltage of the bridge circuit, a current detector that detects a first current flowing as an alternating current between the alternating-current power supply and the bridge circuit, a current detector that detects a second current flowing as a direct current between the bridge circuit and the capacitor, an overcurrent determination unit that determines on the basis of a detected first (Continued)

current value whether or not the first current is an overcurrent, and an overcurrent determination unit that determines on the basis of a detected second current value whether or not the second current is an overcurrent. The bridge circuit stops operating when a determination result of either the overcurrent determination unit or the overcurrent determination unit indicates an overcurrent.

13 Claims, 10 Drawing Sheets

(51) Int. Cl.
*F25B 31/02* (2006.01)
*H02P 29/024* (2016.01)

(56) References Cited

U.S. PATENT DOCUMENTS

| 2009/0135531 | A1* | 5/2009 | Hirata | H02H 7/0838 |
| | | | | 361/18 |
| 2017/0005588 | A1* | 1/2017 | Kato | H02M 5/458 |
| 2020/0366286 | A1* | 11/2020 | Yokosyo | H03K 17/687 |
| 2020/0412234 | A1* | 12/2020 | Hayakawa | H02M 1/32 |

FOREIGN PATENT DOCUMENTS

| JP | 2018-007328 A | 1/2018 |
| WO | 2008/149530 A1 | 12/2008 |
| WO | 2017/199299 A1 | 11/2017 |

\* cited by examiner

FIG.15

DIRECT-CURRENT POWER SUPPLY DEVICE, MOTOR DRIVE DEVICE, BLOWER, COMPRESSOR, AND AIR CONDITIONER

CROSS REFERENCE TO RELATED APPLICATION

This application is a U.S. national stage application of International Patent Application No. PCT/JP2018/036607 filed on Sep. 28, 2018, the disclosure of which is incorporated herein by reference.

TECHNICAL FIELD

The present invention relates to a direct-current power supply device that converts alternating-current power supplied by an alternating-current power supply into direct-current power for supply to a load and also relates to a motor drive device including the direct-current power supply device, a blower including the motor drive device, a compressor including the motor drive device, and an air conditioner including the blower or the compressor.

BACKGROUND

A direct-current power supply device is required to have a function of detecting an overcurrent that can flow in the device. In order to detect an overcurrent, a device disclosed in Patent Literature 1 below is configured to have shunt resistors inserted respectively at two different locations of a current path along which the overcurrent can flow.

PATENT LITERATURE

Patent Literature 1: Japanese Patent Application Laid-open No. 2018-7328

As described above, the technique of Patent Literature 1 requires the addition of the shunt resistors, which are current detectors used respectively at the two different locations of the current path for overcurrent detection, in addition to a current detector that is used for normal control. This increased parts count involves an increase in costs, and with the addition of the two current detectors, the device problematically has reduced reliability.

SUMMARY

The present invention has been made in view of the above, and an object of the present invention is to obtain a direct-current power supply device that is capable of detecting an overcurrent that can flow in the direct-current power supply device with an additional current detector count reduced.

In order to solve the above-stated problem and achieve the object, a direct-current power supply device according to the present invention includes a reactor having one end connected to an alternating-current power supply, a bridge circuit that is connected to another end of the reactor and converts a first voltage that is an alternating-current output of the alternating-current power supply into a direct-current voltage, and a capacitor that smoothes a second voltage that is the direct-current voltage of the bridge circuit. The direct-current power supply device also includes a first current detector that detects a first current flowing as an alternating current between the alternating-current power supply and the bridge circuit, and a second current detector that detects a second current flowing as a direct current between the bridge circuit and the capacitor. The direct-current power supply device also includes a first overcurrent determination unit that determines on the basis of a detected first current value whether or not the first current is an overcurrent, and a second overcurrent determination unit that determines on the basis of a detected second current value whether or not the second current is an overcurrent. The bridge circuit stops operating when a determination result of either the first overcurrent determination unit or the second overcurrent determination unit indicates an overcurrent.

The direct-current power supply device according to the present invention is capable of detecting an overcurrent that can flow in the direct-current power supply device with an additional current detector count reduced.

DETAILED DESCRIPTION

With reference to the accompanying drawings, a description is hereinafter provided of a direct-current power supply device, a motor drive device, a blower, a compressor, and an air conditioner according to embodiments of the present invention. It is to be noted that the following embodiments are not restrictive of the present invention. In the following description, electrical connection is simply referred to as "connection".

First Embodiment

Figure 1:
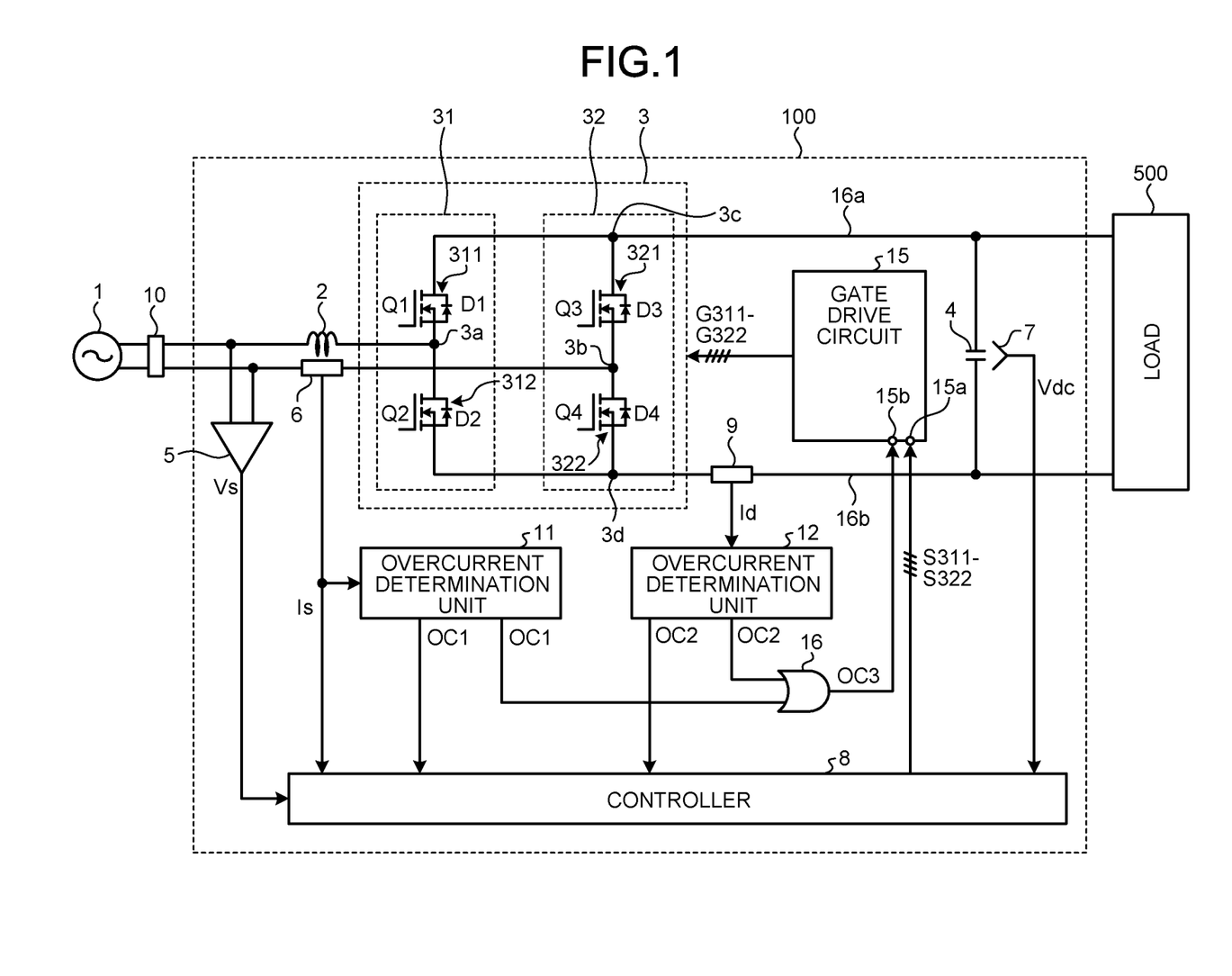
FIG. 1 is a circuit diagram illustrating a configuration of a direct-current power supply device according to a first embodiment.

FIG. 1 is a circuit diagram illustrating a configuration of a direct-current power supply device 100 according to the first embodiment. The direct-current power supply device 100 according to the first embodiment is a power supply device that converts alternating-current power supplied by a single-phase alternating-current power supply 1 into direct-current power for supply to a load 500. As illustrated in FIG. 1, the direct-current power supply device 100 according to the first embodiment includes a reactor 2, a bridge circuit 3, a capacitor 4, a controller 8, and a gate drive circuit 15 that is a drive circuit. The direct-current power supply device 100 also includes a voltage detector 5 that is a first voltage detector, a current detector 6 that is a first current detector, a voltage detector 7 that is a second voltage detector, and a current detector 9 that is a second current detector. The direct-current power supply device 100 also includes an overcurrent determination unit 11 that is a first overcurrent determination unit, an overcurrent determination unit 12 that is a second overcurrent determination unit, and an OR circuit 16.

The load 500 in FIG. 1 is, for example, a motor that is built in a blower, a compressor, or an air conditioner. Between the alternating-current power supply 1 and the direct-current power supply device 100, a breaker 10 is provided as a circuit breaker for protecting the direct-current power supply device 100.

The reactor 2 is connected at one end to one end of the alternating-current power supply 1 via the breaker 10 and is connected at another end to the bridge circuit 3. The bridge circuit 3 converts alternating-current voltage output from the alternating-current power supply 1 into direct-current voltage.

The bridge circuit 3 includes a first leg 31 and a second leg 32. The first leg 31 and the second leg 32 are connected in parallel. The first leg 31 has a first upper-arm element 311 and a first lower-arm element 312 that are connected in series. The second leg 32 has a second upper-arm element 321 and a second lower-arm element 322 that are connected in series. The other end of the reactor 2 is connected to a node 3a between the first upper-arm element 311 and the first lower-arm element 312 of the first leg 31. A node 3b between the second upper-arm element 321 and the second lower-arm element 322 is connected to another end of the alternating-current power supply 1. In the bridge circuit 3, the nodes 3a and 3b compose an alternating-current terminal.

In FIG. 1, the reactor 2 is connected between the one end of the alternating-current power supply 1 and the node 3a. However, the reactor 2 may be connected between another end of the alternating-current power supply 1 and the node 3b.

A side of the bridge circuit 3 that has the nodes 3a and 3b is referred to as "alternating-current side". The alternating-current voltage that the alternating-current power supply 1 outputs is referred to as "power supply voltage", and a period of the power supply voltage is referred to as "power supply period". The power supply voltage is sometimes referred to as "first voltage".

The first upper-arm element 311 includes a switching element Q1 and a diode D1 that is connected in antiparallel with the switching element Q1. The first lower-arm element 312 includes a switching element Q2 and a diode D2 that is connected in antiparallel with the switching element Q2. The second upper-arm element 321 includes a switching element Q3 and a diode D3 that is connected in antiparallel with the switching element Q3. The second lower-arm element 322 includes a switching element Q4 and a diode D4 that is connected in antiparallel with the switching element Q4.

In FIG. 1, a metal-oxide-semiconductor field-effect transistor (MOSFET) is given as an example of each of the switching elements Q1, Q2, Q3, and Q4 but is not limiting. The MOSFET is a switching element capable of carrying current in both directions between a drain and a source. Any switching element may be used as long as the switching element is a bidirectional element capable of carrying current in both directions between a first terminal that corresponds to the drain and a second terminal that corresponds to the source.

The term "antiparallel" refers to connection between the first terminal corresponding to the drain of the MOSFET and a cathode of the diode and connection between the second terminal corresponding to the source of the MOSFET and an anode of the diode. It is to be noted that a parasitic diode that the MOSFET itself internally includes may be used as the diode. The parasitic diode is also called "body diode".

At least one of the switching element Q1, the switching element Q2, the switching element Q3, or the switching element Q4 is not limited to the MOSFET, which is made using a silicon-based material, and may be a MOSFET that is made using a wide bandgap semiconductor such as silicon carbide, gallium nitride, gallium oxide, or diamond.

The wide bandgap semiconductor generally has a high voltage resistance and a high thermal resistance compared with a silicon semiconductor. Therefore, with the use of the wide bandgap semiconductor for the least one of the switching element Q1, the switching element Q2, the switching element Q3, or the switching element Q4, the switching element has increased voltage resistance and increased allowable current density, and a semiconductor module incorporating the switching element can be smaller in size.

The capacitor 4 is connected at one end to a high-potential-side direct-current busbar 16a. The direct-current busbar 16a is extended from a node 3c between the first upper-arm element 311 of the first leg 31 and the second upper-arm element 321 of the second leg 32. The capacitor 4 is connected at another end to a low-potential-side direct-current busbar 16b. The direct-current busbar 16b is extended from a node 3d between the first lower-arm element 312 of the first leg 31 and the second lower-arm element 322 of the second leg 32. In the bridge circuit 3, the nodes 3c and 3d compose a direct-current terminal. A side of the bridge circuit 3 that has the nodes 3c and 3d is referred to as "direct-current side".

The output voltage of the bridge circuit 3 is applied across the capacitor 4. The capacitor 4 smoothes the output voltage of the bridge circuit 3. The capacitor 4 is connected to the direct-current busbars 16a and 16b. The voltage smoothed by the capacitor 4 is referred to as "bus voltage". The bus voltage is sometimes referred to as "second voltage". The bus voltage is what is applied to the load 500.

The voltage detector 5 detects the power supply voltage and outputs a detected power supply voltage value Vs to the controller 8. The power supply voltage is an absolute value of instantaneous voltage of the alternating-current power supply 1. It is to be noted that the power supply voltage may be an effective value of the instantaneous voltage.

The current detector 6 detects alternating current flowing between the alternating-current power supply 1 and the bridge circuit 3 and outputs a detected alternating current value Is to the controller 8 and the overcurrent determination unit 11. The current detector 6 is, for example, a current transformer (CT). The alternating current flowing between the alternating-current power supply 1 and the bridge circuit 3 is sometimes referred to as "first current".

The voltage detector 7 detects the bus voltage and outputs a detected bus voltage value Vdc to the controller 8.

The current detector 9 is disposed at the direct-current busbar 16*b*. The current detector 9 detects direct current flowing between a negative terminal of the capacitor 4 and the node 3*d* of the bridge circuit 3 and outputs a detected direct current value Id to the overcurrent determination unit 12. The current detector 9 is, for example, a shunt resistor. The direct current flowing between the bridge circuit 3 and the capacitor 4 is sometimes referred to as "second current". In FIG. 1, the current detector 9 is disposed at the direct-current busbar 16*b*. However, the current detector 9 may be disposed at the direct-current busbar 16*a*. In that case, the current detector 9 detects the direct current flowing between the node 3*c* of the bridge circuit 3 and a positive terminal of the capacitor 4.

On the basis of the detected value Vs from the voltage detector 5, the detected value Is from the current detector 6, and the detected value Vdc from the voltage detector 7, the controller 8 generates control signals S311, S312, S321, and S322 for controlling the switching elements Q1 to Q4 of the bridge circuit 3. The control signal S311 controls the switching element Q1, and the control signal S322 controls the switching element Q4. The switching elements Q2 and Q3 are also controlled respectively by the control signals from the controller 8. The control signals S311, S312, S321, and S322 generated by the controller 8 are input to an input port 15*a* of the gate drive circuit 15.

On the basis of the control signals S311, S312, S321, and S322, the gate drive circuit 15 generates drive pulses G311, G312, G321, and G322 for driving the switching elements Q1 to Q4 of the bridge circuit 3. The drive pulse G311 drives the switching element Q1, and the drive pulse G322 drives the switching element Q4. The switching elements Q2 and Q3 are also driven respectively by the drive pulses from the gate drive circuit 15.

On the basis of the detected alternating current value Is, the overcurrent determination unit 11 determines whether or not the alternating current is an overcurrent and outputs a determination result OC1 to the controller 8 and the OR circuit 16. A threshold A is used as a first threshold in this overcurrent determination. When the detected alternating current value Is is greater than the threshold A, the overcurrent determination unit 11 determines that the alternating current is an overcurrent and causes the determination result OC1 to indicate a logical "1". When, on the other hand, the detected alternating current value Is is smaller than or equal to the threshold A, the overcurrent determination unit 11 determines that the alternating current is not an overcurrent and causes the determination result OC1 to indicate a logical "0". It is to be noted that when the detected value Is is equal to the threshold A, a determination of either "no overcurrent" or "overcurrent" may be made in this determination process.

On the basis of the detected direct current value Id, the overcurrent determination unit 12 determines whether or not the direct current is an overcurrent and outputs a determination result OC2 to the controller 8 and the OR circuit 16. A threshold B is used as a second threshold in this overcurrent determination. When the detected direct current value Id is greater than the threshold B, the overcurrent determination unit 12 determines that the direct current is an overcurrent and causes the determination result OC2 to indicate a logical "1". When, on the other hand, the detected direct current value Id is smaller than or equal to the threshold B, the overcurrent determination unit 12 determines that the direct current is not an overcurrent and causes the determination result OC2 to indicate a logical "0". It is to be noted that when the detected value Id is equal to the threshold B, a determination of either "no overcurrent" or "overcurrent" may be made in this determination process.

The OR circuit 16 performs a logical OR operation on the determination results OC1 and OC2. Specifically, when at least one of the determination result OC1 or the determination result OC2 indicates the logical "1", the OR circuit 16 causes an operation value OC3 to be a logical "1". When, on the other hand, both the determination results OC1 and OC2 indicate the logical "0", the OR circuit 16 causes the operation value OC3 to be a logical "0". The operation value OC3 of the OR circuit 16 indicates a result of overcurrent detection. The operation value OC3 is input to an input port 15*b* of the gate drive circuit 15.

When the operation value OC3 is the logical "1", the gate drive circuit 15 stops outputting the drive pulses G311, G312, G321, and G322 that drive the switching elements Q1 to Q4 of the bridge circuit 3. In other words, when the operation value OC3 is input as the logical "1" to the input port 15*b*, the output of the drive pulses G311, G312, G321 and G322 to the bridge circuit 3 is blocked even with the control signals S311, S312, S321, and S322 being input to the input port 15*a* from the controller 8.

When the operation value OC3 is the logical "0", the gate drive circuit 15 operates normally. In other words, with the control signals S311, S312, S321, and S322 being input to the input port 15*a* from the controller 8, the gate drive circuit 15 generates the drive pulses G311, G312, G321, and G322 based on the control signals S311, S312, S321, and S322 and outputs the generated drive pulses G311, G312, G321, and G322 to the bridge circuit 3.

Under the above control, the bridge circuit 3 stops switching operation of all the switching elements Q1 to Q4 when the determination result of either the overcurrent determination unit 11 or the overcurrent determination unit 12 indicates the overcurrent.

The controller 8 also receives the determination result OC1 and the determination result OC2. When at least one of the determination result OC1 or the determination result OC2 indicates the logical "1", the controller 8 stops generating the control signals S311, S312, S321, and S322. Consequently, none of the control signals S311, S312, S321, and S322 is input to the gate drive circuit 15, meaning that the output of the drive pulses G311, G312, G321, and G322 to the bridge circuit 3 stops.

The stop control that uses the overcurrent determination unit 11, the overcurrent determination unit 12, and the OR circuit 16 (hereinafter referred to as "first stop control" as appropriate) is performed only when an overcurrent flows. The first stop control is performed prior to the stop control (hereinafter referred to as "second stop control" as appropriate) that the controller 8 performs on the basis of the determination results of the overcurrent determination units 11 and 12. On the other hand, the second stop control is continuous once the overcurrent is detected. Performing the first stop control in parallel with the second stop control enables reliable prevention of an increase in a number of switching element failures.

In the above-described configuration according to the first embodiment, the voltage detector 5, the current detector 6, and the voltage detector 7 are the three detectors to use in the control of the switching elements Q1 to Q4 of the bridge circuit 3. The current detector 6 and the current detector 9 are the two detectors to use in the overcurrent detection. In the configuration according to the first embodiment, the current detector 6 is used in both the control of the switching elements Q1 to Q4 and the overcurrent detection, so that the current detector 9 is the only newly added detector. The configuration according to the first embodiment, therefore, can have an additional current detector count reduced.

With reference to FIGS. 1 to 5, a description is provided next of circuit operation of a principal part of the direct-current power supply device 100 according to the first embodiment.

Figure 2:
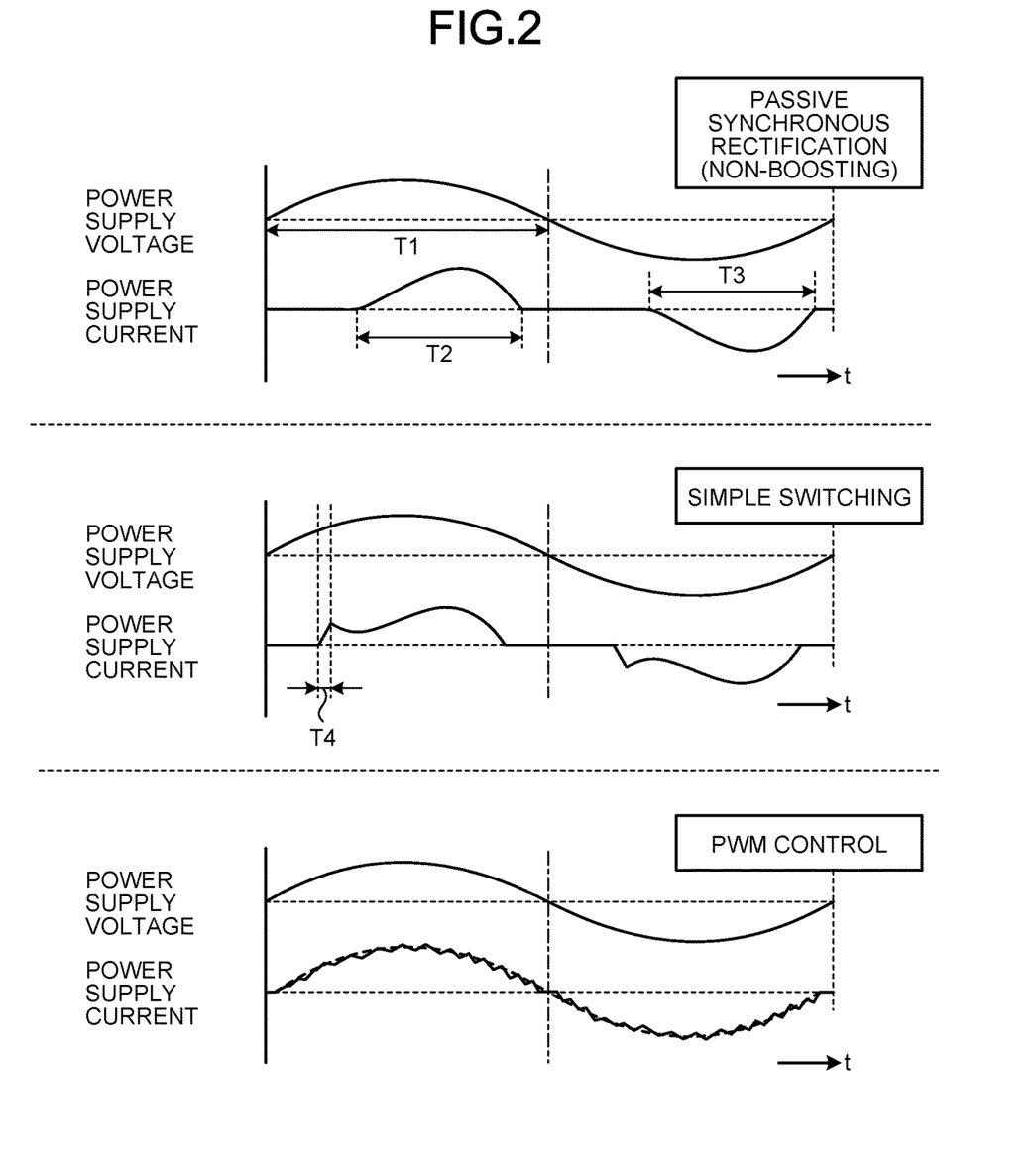
FIG. 2 illustrates operating modes of the direct-current power supply device according to the first embodiment.
Figure 3:
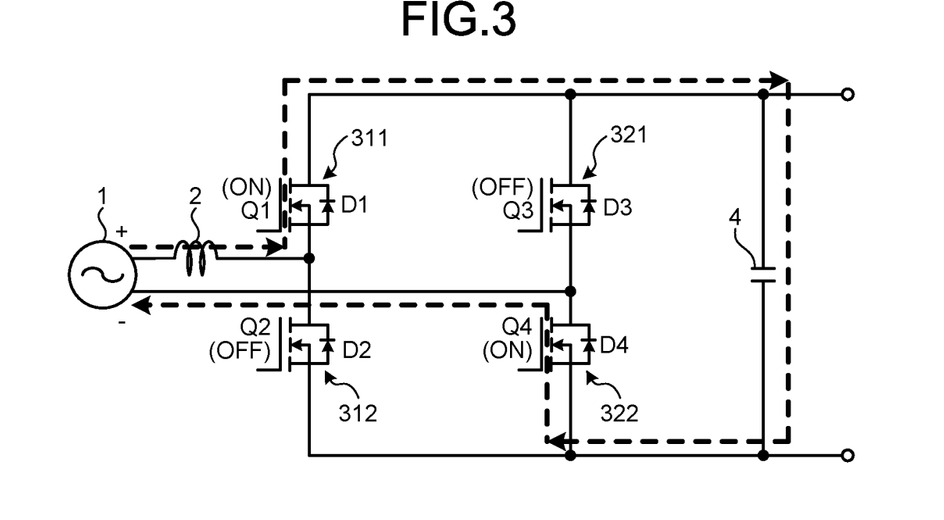
FIG. 3 illustrates one of current paths in a bridge circuit according to the first embodiment in a passive synchronous rectification mode.
Figure 4:
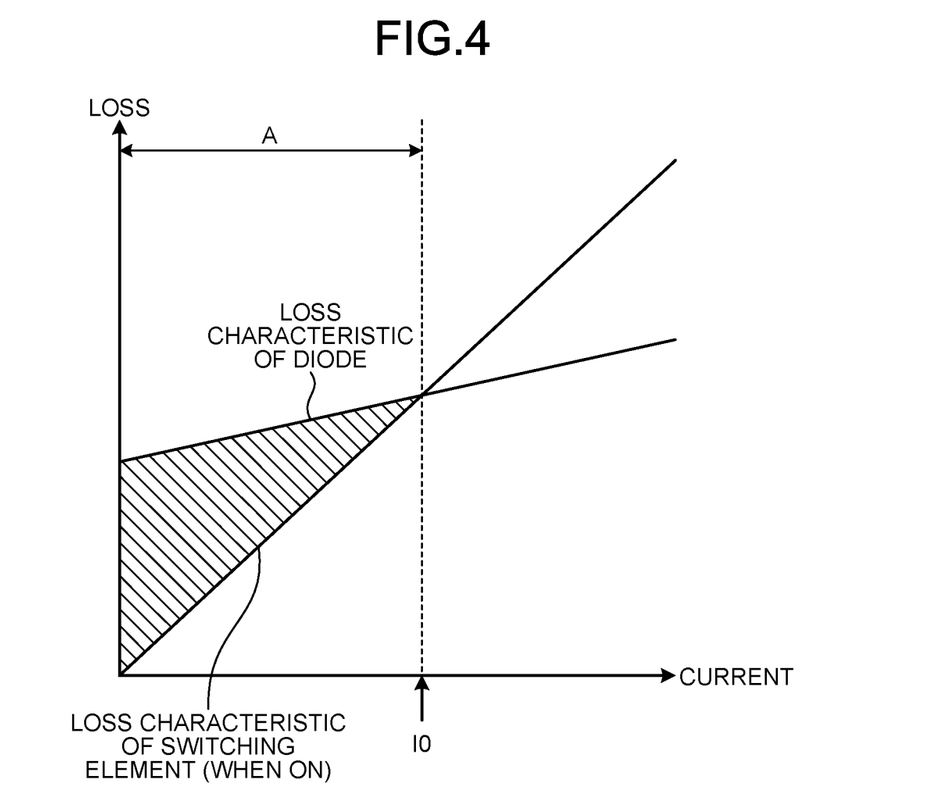
FIG. 4 schematically illustrates a current-loss characteristic of a typical switching element.
Figure 5:
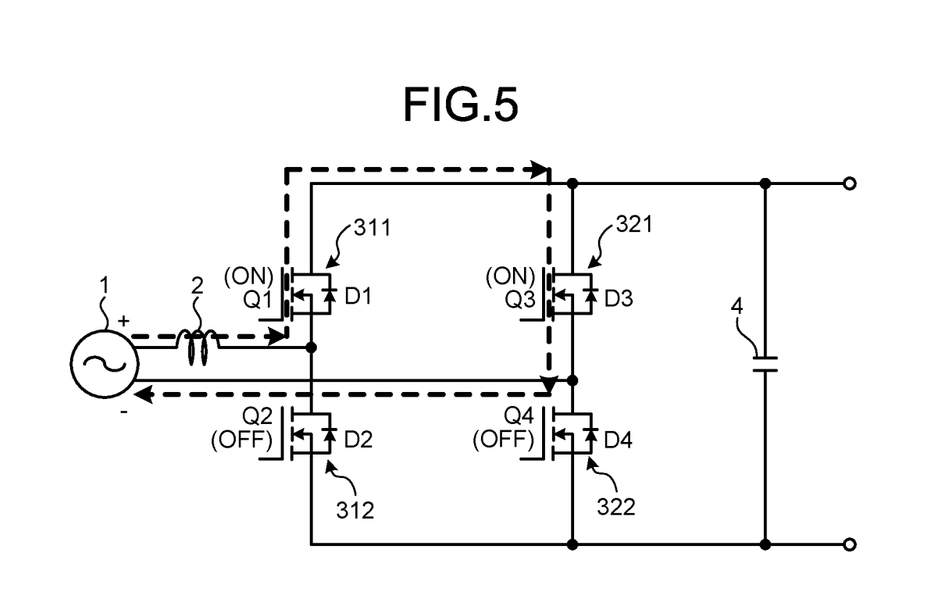
FIG. 5 illustrates one of current paths in the bridge circuit according to the first embodiment in a simple switching mode.

FIG. 2 illustrates operating modes of the direct-current power supply device 100 according to the first embodiment. The three operating modes illustrated by FIG. 2 include a passive synchronous rectification mode, a simple switching mode, and a pulse width modulation (PWM) control mode. FIG. 3 illustrates one of current paths in the bridge circuit 3 according to the first embodiment in the passive synchronous rectification mode. FIG. 4 schematically illustrates a current-loss characteristic of a typical switching element. FIG. 5 illustrates one of current paths in the bridge circuit 3 according to the first embodiment in the simple switching mode.

Shown in a top row of FIG. 2 are the power supply voltage and power supply current in the passive synchronous rectification mode. This operating mode is a non-boosting synchronous rectification mode. The term "non-boosting" refers to no power supply short-circuiting operation. Power supply short-circuiting operation is described later. Synchronous rectification is a control method with which a switching element that is connected in antiparallel with a diode is turned ON at a timing when current flows through the diode.

FIG. 3 illustrates the path for charging the capacitor 4 when the synchronous rectification is performed with the power supply voltage having positive polarity. As illustrated in FIG. 3, the polarity of the power supply voltage is positive when an upper terminal of the alternating-current power supply 1 has a positive potential. When the upper terminal of the alternating-current power supply 1 has a negative potential, the power supply voltage has negative polarity.

In FIG. 3, when the capacitor 4 is charged by the current supplied by the alternating-current power supply 1 with the switching elements Q1 and Q4 turned off, the current flows in order of the alternating-current power supply 1, the reactor 2, the diode D1, the capacitor 4, the diode D4, and the alternating-current power supply 1. A diode does not conduct unless a voltage equivalent to a voltage drop is applied in a current flow direction, namely, in a forward direction. Therefore, as the top row of FIG. 2 illustrates, in a positive half period T1 of the power supply voltage, the current flows in a period T2 that is shorter than the half period T1. In the passive synchronous rectification mode, the switching elements Q1 and Q4 are controlled to be ON at a timing when the diodes D1 and D4 conduct in the period T2. Thus in the period T2, the current flows in order of the alternating-current power supply 1, the reactor 2, the switching element Q1, the capacitor 4, the switching element Q4, and the alternating-current power supply 1.

Similar operation takes place in a negative half period of the power supply voltage. However, in the negative half period of the power supply voltage, the switching elements Q2 and Q3 are controlled to be ON at a timing when the diodes D2 and D3 conduct in a period T3.

FIG. 4 illustrates a loss characteristic of the diode and the loss characteristic of the switching element when the switching element is on. As FIG. 4 illustrates, in a region A where currents are smaller than a current value I0, the diode has great losses compared with the switching element. The synchronous rectification uses these characteristics, and with the synchronous rectification, the switching element connected in antiparallel with the diode is turned ON at the timing when the current flows through the diode. The use of the synchronous rectification enables a device to operate with high efficiency.

Shown in a middle row of FIG. 2 are the power supply voltage and power supply current in the simple switching mode. In this operating mode, the power supply short-circuiting operation is performed once or several times in the half period of the power supply voltage. In an example illustrated by the middle row of FIG. 2, the power supply short-circuiting operation is performed once in the half period of the power supply voltage.

FIG. 5 illustrates the short circuit path for the alternating-current power supply 1 through the reactor 2 when the synchronous rectification is performed with the power supply voltage having the positive polarity. As illustrated in FIG. 5, the switching elements Q1 and Q3 are turned ON in a period T4. Thus the current flows in order of the alternating-current power supply 1, the reactor 2, the switching element Q1, the switching element Q3, and the alternating-current power supply 1, and electrical energy is stored in the reactor 2.

After the period T4, the passive synchronous rectification mode illustrated in the top row of FIG. 2 is introduced for operation. Immediately after the period T4, the sum of the voltage of the alternating-current power supply 1 and a voltage in the reactor 2 is applied to the bridge circuit 3. Therefore, the diodes D1 and D4 of the bridge circuit 3 conduct. At the timing when the diodes D1 and D4 conduct, the switching elements Q1 and Q4 are turned ON to allow the power supply current to flow.

In FIG. 5, the switching elements Q1 and Q3 are turned ON. However, the switching elements Q2 and Q4 may be turned ON instead. In that case, the current flows in order of the alternating-current power supply 1, the reactor 2, the switching element Q2, the switching element Q4, and the alternating-current power supply 1.

In the negative half period, the power supply short-circuiting operation is similarly performed once or several times and is followed by the passive synchronous rectification operation. In the power supply short-circuiting operation, the switching elements Q1 and Q3 may be turned ON, or the switching elements Q2 and Q4 may be turned ON.

Shown in a bottom row of FIG. 2 are the power supply voltage and power supply current in the PWM control mode. In this operating mode, the power supply short-circuiting operation that causes the reactor 2 to store the electrical energy and charge operation that uses the electrical energy stored in the reactor 2 to charge the capacitor 4 are alternately repeated. Switching between the power supply short-circuiting operation and the charge operation is performed at a high frequency ranging from a few kHz to tens of kHz. With this control, the power supply current becomes sinusoidal as illustrated in the bottom row of FIG. 2.

Switching between the above-stated three modes is performed according to a load condition. This enables the direct-current power supply device 100 to operate with high efficiency.

Figure 6:
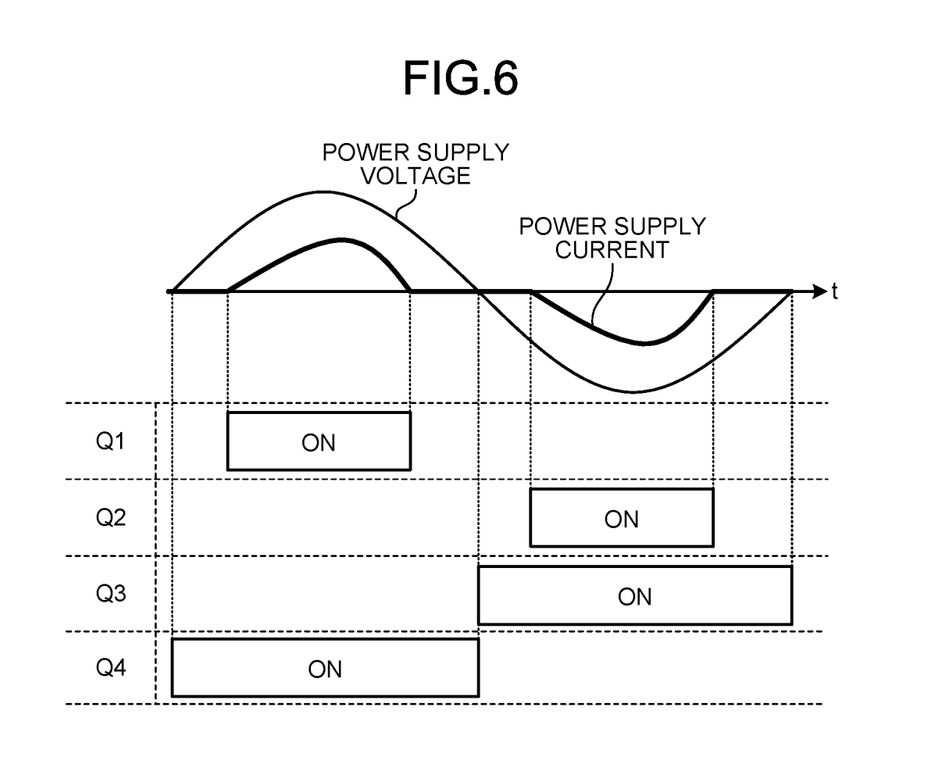
FIG. 6 is a first diagram that is used for illustrating causes of an overcurrent that flows in the bridge circuit according to the first embodiment.
Figure 7:
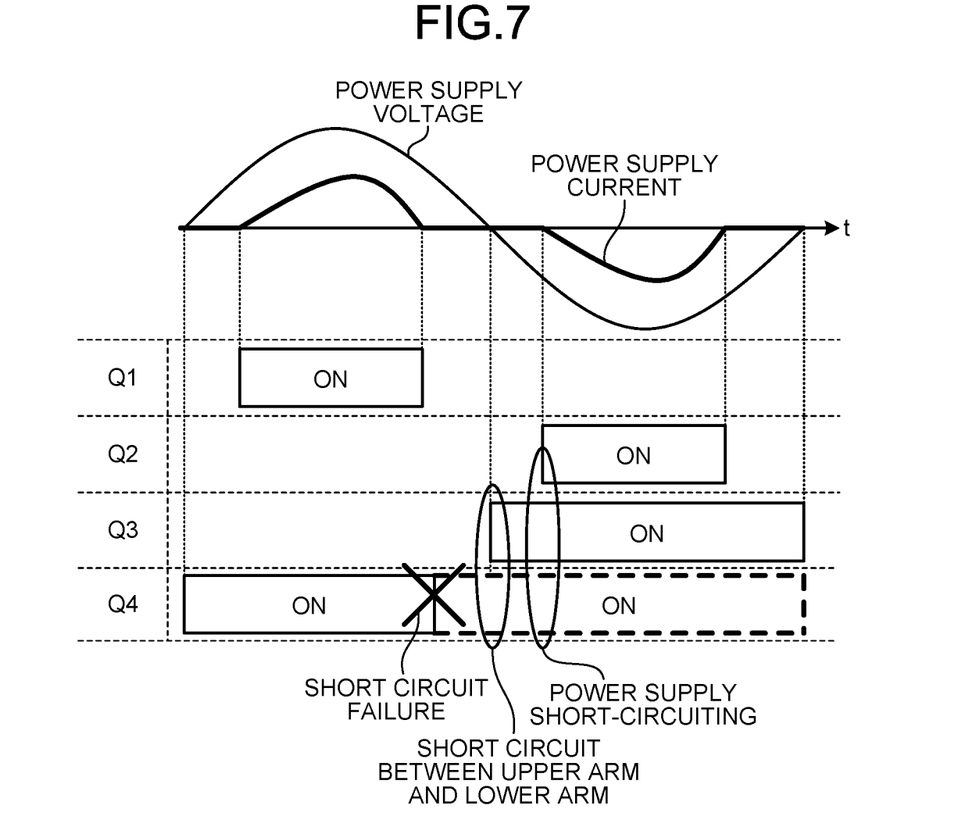
FIG. 7 is a second diagram illustrating the causes of the overcurrent that flows in the bridge circuit according to the first embodiment.
Figure 8:
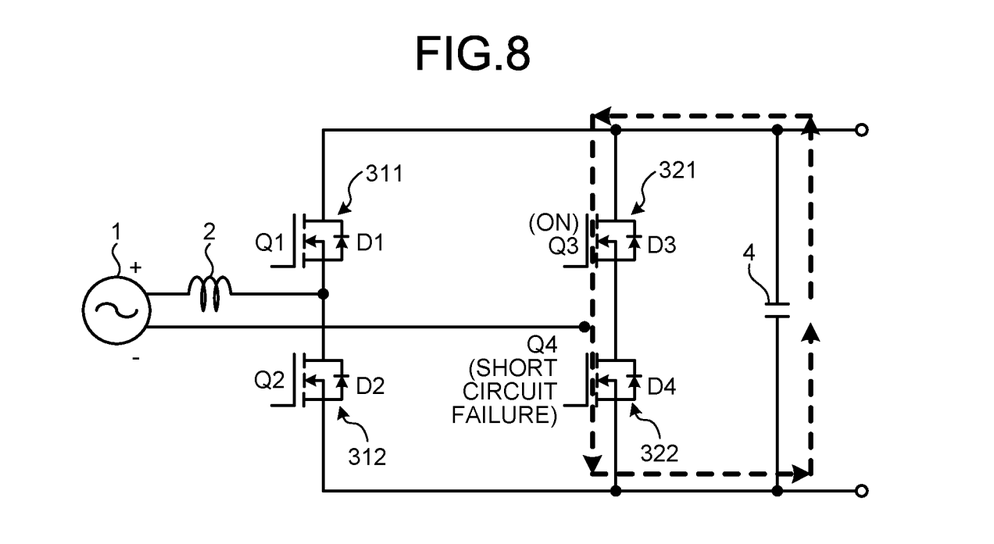
FIG. 8 is a first diagram illustrating an overcurrent path in the bridge circuit according to the first embodiment.
Figure 9:
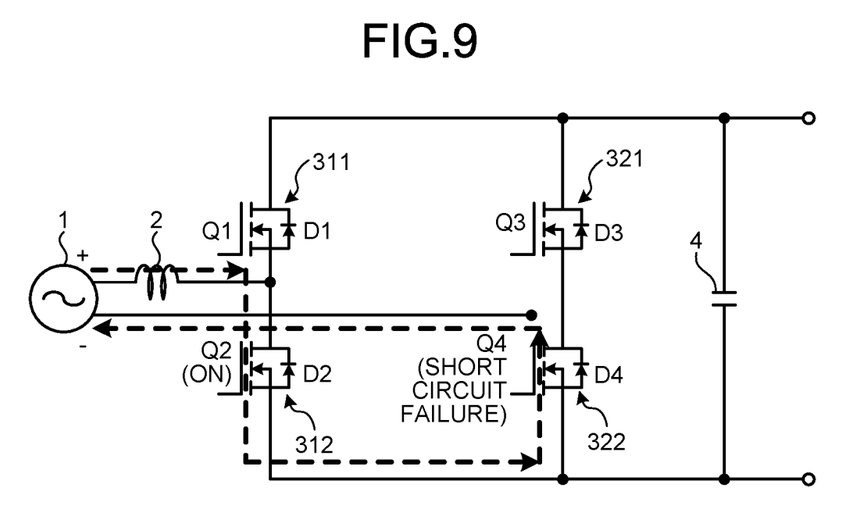
FIG. 9 is a second diagram illustrating an overcurrent path in the bridge circuit according to the first embodiment.

With reference to FIGS. 6 to 9, a description is provided next of causes and paths of an overcurrent that flows in the bridge circuit 3 according to the first embodiment. FIG. 6 is a first diagram that is used for illustrating the causes of the overcurrent that flows in the bridge circuit 3 according to the first embodiment. FIG. 7 is a second diagram illustrating the causes of the overcurrent that flows in the bridge circuit 3 according to the first embodiment. FIG. 8 is a first diagram illustrating the overcurrent path in the bridge circuit 3 according to the first embodiment. FIG. 9 is a second diagram illustrating the overcurrent path in the bridge circuit 3 according to the first embodiment.

FIG. 6 illustrates the switching elements Q1 to Q4 in bridge circuit 3 of the FIG. 1 in respective states that are illustrated as examples. The examples illustrated in FIG. 6 are the operating states in the above-stated passive synchronous rectification mode and are such that the switching elements Q1 and Q2 are controlled to be ON for the synchronous rectification, while each of the switching elements Q3 and Q4 is controlled to alternately turn ON and OFF in the period of the power supply voltage. Periods other than those periods that say "ON" correspond to OFF states, respectively.

FIG. 7 illustrates operating states based on the states of FIG. 6 when the switching element Q4 results in short circuit failure. When the switching element Q4 results in the short circuit failure in a certain period as in FIG. 7, in the next half period after the short circuit failure, a short circuit takes place between an upper arm and a lower arm, meaning that the switching elements Q3 and Q4 conduct at the same time. FIG. 8 illustrates the current path in this case. A mode of causing the current path illustrated in FIG. 8 is referred to as "short circuit mode 1" for convenience.

Here the current flows between the alternating-current power supply 1 and the bridge circuit 3 through the two switching elements Q3 and Q4, short-circuiting the direct-current voltage. Therefore, in the short circuit mode 1, the short-circuit current as large as hundreds of amperes flows in a few microseconds. This short-circuit current is the cause of the above-stated "overcurrent flowing between the bridge circuit 3 and the capacitor 4". Accordingly, whether or not this short-circuit current is an overcurrent is detected by means of the current detector 9, the overcurrent determination unit 12, and the OR circuit 16.

In FIG. 7, power supply short-circuiting takes place at a timing when the switching element Q2 turns ON, meaning that the switching elements Q2 and Q4 conduct. FIG. 9 illustrates the current path in this case. A mode of causing the current path illustrated in FIG. 9 is referred to as "short circuit mode 2" for convenience.

In the short circuit mode 2, the current flowing through the reactor 2 is a short-circuit current. Therefore, in the short circuit mode 2, the short-circuit current of the order of tens of amperes flows in a few milliseconds. This short-circuit current is the cause of the above-stated "overcurrent flowing between the alternating-current power supply 1 and the bridge circuit 3". Accordingly, whether or not this short-circuit current is an overcurrent is detected by means of the current detector 6, the overcurrent determination unit 11, and the OR circuit 16.

The above description is based on the short circuit failure of the switching element Q4; however, states similar to the short circuit modes 1 and 2 arise even when at least one of the switching elements Q1, the switching element Q2, or the switching element Q3 results in short circuit failure.

Even if none of the switching elements Q1 to Q4 results in short circuit failure, external noise can cause the switching element to malfunction, so that states similar to the short circuit modes 1 and 2 arise. The direct-current power supply device 100 according to the first embodiment is capable of detecting the short-circuit currents in these cases, and this detection is effective in protecting the direct-current power supply device 100.

Figure 10:
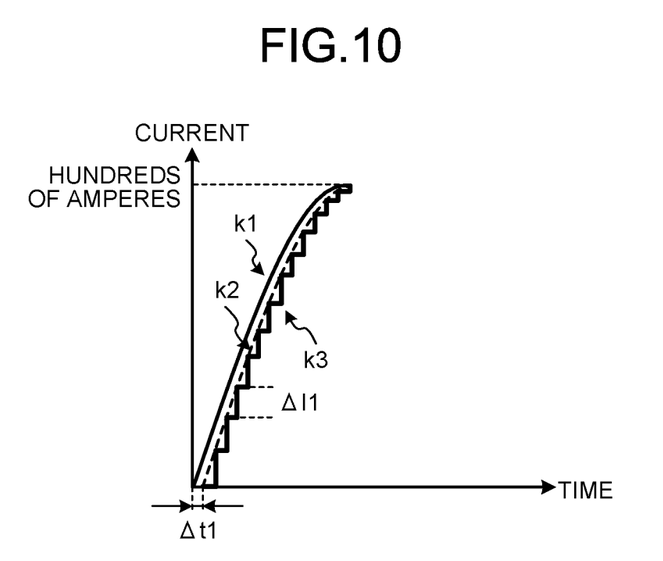
FIG. 10 illustrates detection accuracy and a detection speed that are required of a second current detector according to the first embodiment.
Figure 11:
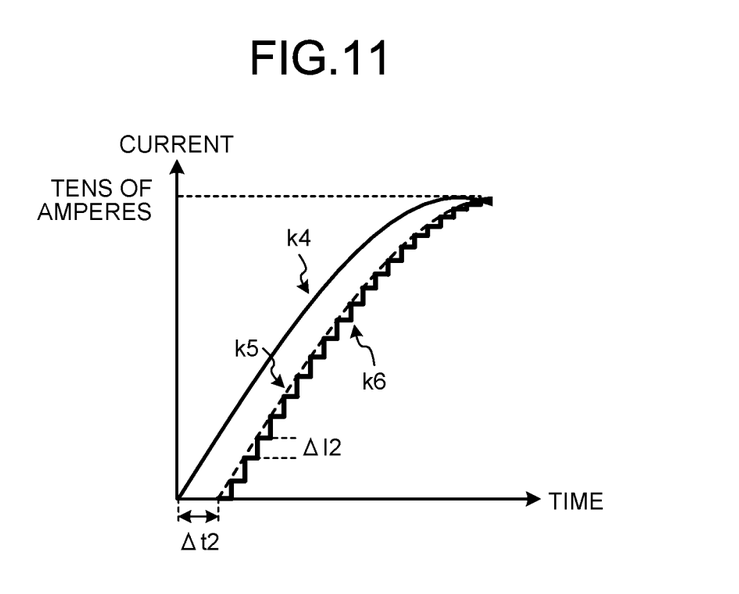
FIG. 11 illustrates detection accuracy and a detection speed that are required of a first current detector according to the first embodiment.

A description is provided next of detection accuracy and a detection speed that are required of each of the current detectors 6 and 9 that detect the overcurrents. FIG. 10 illustrates the detection accuracy and the detection speed that are required of the current detector 9 according to the first embodiment. FIG. 11 illustrates the detection accuracy and the detection speed that are required of the current detector 6 according to the first embodiment.

A curve k1 indicated by a solid line in FIG. 10 represents a current rise characteristic in the short circuit mode 1. A curve k4 indicated by a solid line in FIG. 11 represents a current rise characteristic in the short circuit mode 2. It is to be noted that FIGS. 10 and 11 are schematic diagrams having different scales of horizontal axes for time and different scales of vertical axes for current.

As FIGS. 10 and 11 illustrate, the current rise characteristic is steeper in the short circuit mode 1 than in the short circuit mode 2. For this reason, the current detector 9 is required to have the higher detection speed than the current detector 6. Accordingly, a current detection delay time $\Delta t1$ with respect to the curve k1 needs to be shorter than a current detection delay time $\Delta t2$ with respect to the curve k4. The delay time $\Delta t1$ ranges, for example, from about 0.1 to 1 μs, while the delay time $\Delta t2$ ranges, for example, from about 10 to 100 μs.

In FIG. 10, a curve k2 indicated by a broken line is where the curve k1 has shifted by $\Delta t1$ in a positive direction along the time axis, and a stepped curve k3 indicated by a thick solid line represents discrete detected values that are obtained when current values of the curve k2 are each detected in a certain processing time. Similarly, a curve k5 indicated by a broken line in FIG. 11 is where the curve k4 has shifted by $\Delta t2$ in a positive direction along the time axis, and a stepped curve k6 indicated by a thick solid line represents discrete detected values that are obtained when current values of the curve k5 are each detected in a certain processing time.

Resolution $\Delta I1$ of the curve k3 in FIG. 10 ranges, for example, from about 10 to 100 amperes, and resolution $\Delta I2$ of the curve k6 in FIG. 11 ranges, for example, from about 0.01 to 1 ampere. In other words, the resolution $\Delta I1$ of a detected value of the current detector 9 may be lower than the resolution $\Delta I2$ of a detected value of the current detector 6.

As described above, the current detection speed of the current detector 6 may be lower than that of the current detector 9. This enables the existing current detector provided for the control of the switching elements Q1 to Q4 of the bridge circuit 3 to be a dual-use detector. Therefore, this eliminates the need for adding a new current detector, thus enabling cost reduction and preventing the direct-current power supply device 100 from having reduced reliability.

Although the current detector 9 is required to have high speed performance, an error of about tens of amperes is permissible, so that the resolution of its detected value may be lower than that of the current detector 6. This enables the current detector 9 to be low-cost compared with the current detector 6. Therefore, such a newly required current detector enables an increase in costs of a system configuration to be reduced or eliminated.

As mentioned above, a current Is1 in the short circuit mode 1 and a current Is2 in the short circuit mode 2 have the relation Is1>Is2. Therefore, the threshold A, which is a determination threshold to use in the overcurrent determination unit 11 for the overcurrent determination in the short circuit mode 2, and the threshold B, which is a determination threshold to use in the overcurrent determination unit 12 for the overcurrent detection in the short circuit mode 1, are set to have the relation threshold A<threshold B.

The threshold A is preferably set smaller than a capacity value of the breaker 10. Setting the threshold A smaller than the capacity value of the breaker 10 enables the switching operation of the switching elements Q1 to Q4 to be stopped before the breaker 10 operates. This enables prevention of failure of those switching elements other than the switching element that has resulted in the short circuit failure. In other words, this enables prevention of an increase in the number of switching element failures.

Figure 12:
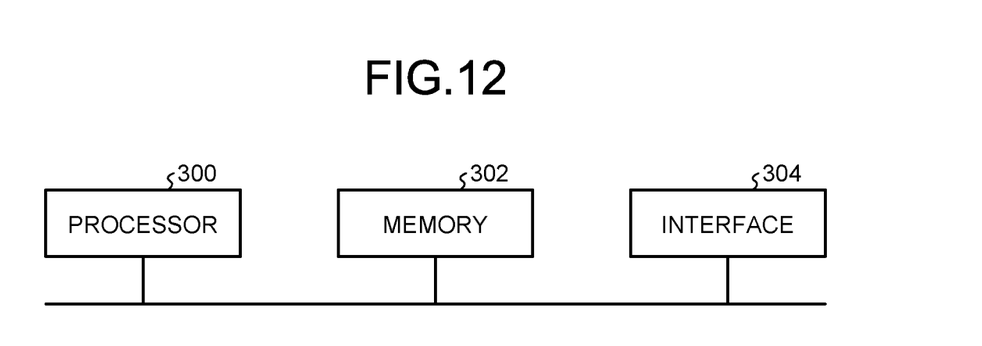
FIG. 12 is a block diagram illustrating an example of a hardware configuration that functionally embodies a controller and a first overcurrent determination unit according to the first embodiment.
Figure 13:
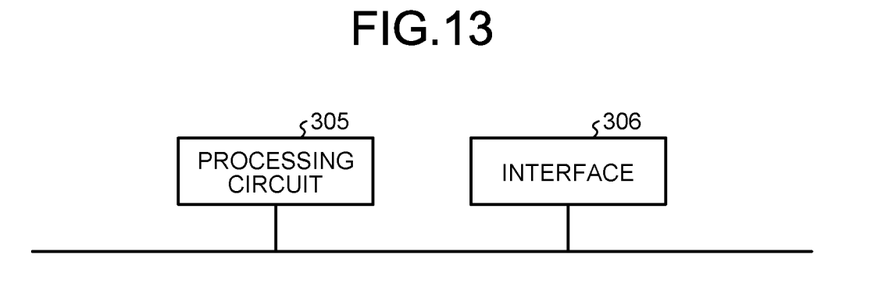
FIG. 13 is a block diagram illustrating an example of a hardware configuration that functionally embodies a second overcurrent determination unit according to the first embodiment.

With reference to FIGS. 12 and 13, a description is provided next of hardware configurations that functionally implement the controller 8 and the overcurrent determination units 11 and 12 according to the first embodiment. FIG. 12 is a block diagram illustrating an example of the hardware configuration that functionally embodies the controller 8 and the overcurrent determination unit 11 according to the first embodiment. FIG. 13 is a block diagram illustrating an example of the hardware configuration that functionally embodies the overcurrent determination unit 12 according to the first embodiment.

In order to functionally implement the controller 8 according to the first embodiment, the configuration may include, as illustrated in FIG. 12, a processor 300 that performs operations, a memory 302 that stores programs to be read by the processor 300, and an interface 304 through which signals are input and output.

The processor 300 may be an arithmetic means such as an arithmetic unit, a microprocessor, a microcomputer, a central processing unit (CPU), or a digital signal processor (DSP). An example of the memory 302 that can be given is a magnetic disk, a flexible disk, an optical disk, a compact disk, a mini disk, a digital versatile disc (DVD), or a nonvolatile or volatile semiconductor memory such as a random-access memory (RAM), a read-only memory (ROM), a flash memory, an erasable programmable ROM (EPROM), or an electrically EPROM (EEPROM) (registered trademark).

Stored in the memory 302 are programs that perform those functions of the controller 8 and the overcurrent determination unit 11 according to the first embodiment. The processor 300 transmits and receives necessary information through the interface 304 and executes the programs stored in the memory 302. By referring to tables stored in the memory 302, the processor 300 is capable of performing the above-described processes. Operation results of the processor 300 can be stored in the memory 302.

In order to functionally implement the overcurrent determination unit 12 according to the first embodiment, a processing circuitry 305 illustrated in FIG. 12 is usable. The processing circuitry 305 corresponds to a single circuit, a composite circuit, an application specific integrated circuit (ASIC), a field-programmable gate array (FPGA), or a combination of these. Through an interface 306, information can be input to and output from the processing circuitry 305.

As described above, the overcurrent determination unit 12 determines the overcurrent on the basis of the detected current value in the short circuit mode 1 in which the rise characteristic is steeper. Therefore, this process preferably uses the processing circuitry 305, not the processor 300.

The processes of the controller 8 and the overcurrent determination unit 11 may be partially performed by the processing circuitry 305, which is included in the configuration illustrated by FIG. 13.

As described above, the first overcurrent determination unit of the direct-current power supply device according to the first embodiment determines on the basis of a detected first current value whether or not the first current flowing as the alternating current between the alternating-current power supply and the bridge circuit is an overcurrent. The second overcurrent determination unit determines on the basis of a detected second current value whether or not the second current flowing as the direct current between the bridge circuit and the capacitor is an overcurrent. The detected value of the existing current detector is usable as the detected first current value. This enables detection of the overcurrent that can flow in the direct-current power supply device with the additional current detector count reduced.

When the determination result of either the first overcurrent determination unit or the second overcurrent determination unit indicates the overcurrent, the switching operation of the switching elements stops in the bridge circuit of the direct-current power supply device according to the first embodiment. This enables prevention of failure of those switching elements other than the switching element that has resulted in the short circuit failure. In other words, this enables prevention of an increase in the number of switching element failures.

Second Embodiment

Figure 14:
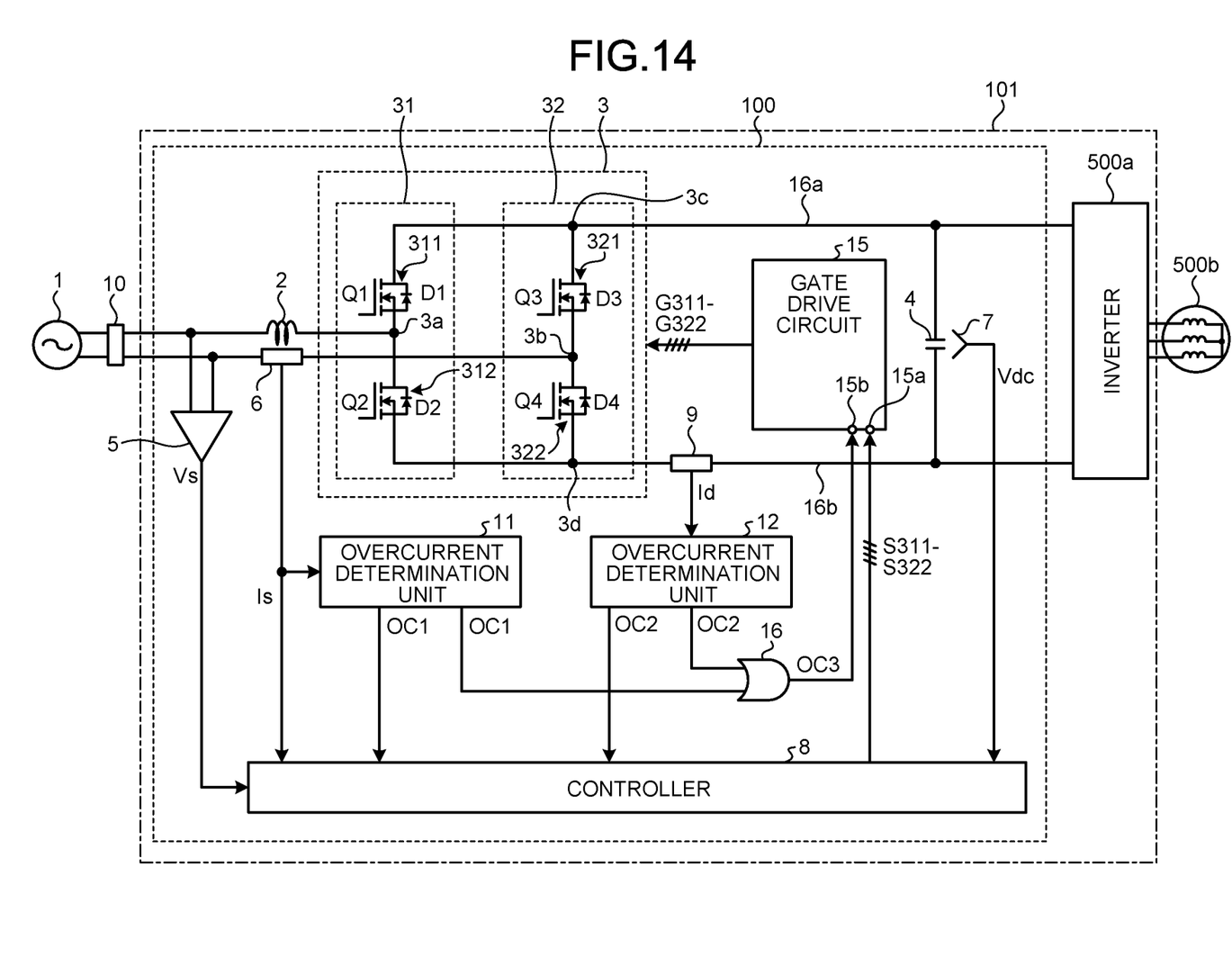
FIG. 14 illustrates an example of application to a motor drive device according to a second embodiment.

FIG. 14 illustrates an example of application to a motor drive device according to the second embodiment. The direct-current power supply device 100 described in the first embodiment is applicable to a motor drive device that supplies direct-current power to an inverter. A description is hereinafter provided of the example in which the direct-current power supply device 100 described in the first embodiment is applied to the motor drive device.

As illustrated in FIG. 14, the motor drive device 101 according to the second embodiment includes an inverter 500a and the direct-current power supply device 100 according to the first embodiment. As described earlier, the direct-current power supply device 100 converts alternating-current power into direct-current power. The inverter 500a converts the direct-current power output from the direct-current power supply device 100 into alternating-current power.

A motor 500b is connected to an output side of the inverter 500a. After the conversion, the inverter 500a supplies the alternating-current power to the motor 500b to drive the motor 500b.

The motor drive device 101 illustrated in FIG. 14 is applicable to a product such as a blower, a compressor, or an air conditioner.

Figure 15:
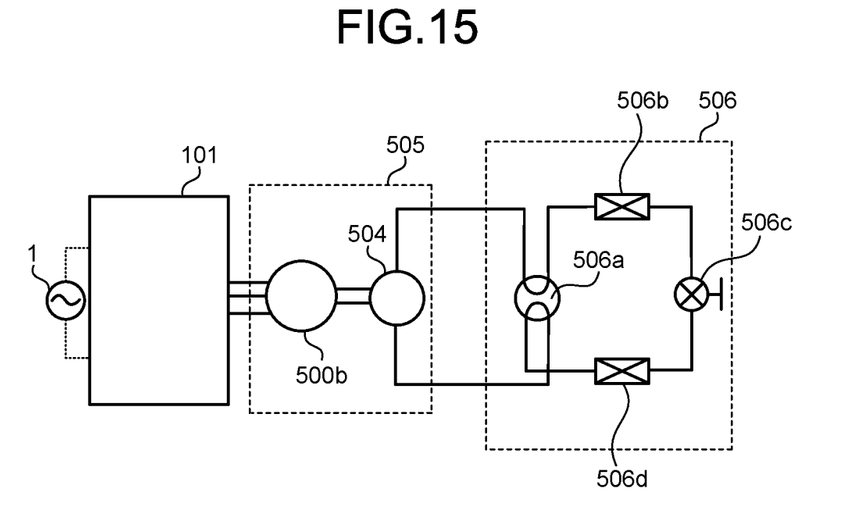
FIG. 15 illustrates an example in which the motor drive device illustrated in FIG. 14 is applied to an air conditioner.

FIG. 15 illustrates an example in which the motor drive device 101 illustrated in FIG. 14 is applied to the air conditioner. The motor 500b is connected to an output side of the motor drive device 101 and is connected to a compression element 504. A compressor 505 includes the motor 500b and the compression element 504. A refrigeration cycle unit 506 is configured to include a four-way valve 506a, an indoor heat exchanger 506b, an expansion valve 506c, and an outdoor heat exchanger 506d.

A path of a refrigerant that circulates through the air conditioner is such that the refrigerant leaves the compression element 504, flows through the four-way valve 506a, the indoor heat exchanger 506b, the expansion valve 506c, and the outdoor heat exchanger 506d, flows through the four-way valve 506a again and returns to the compression element 504. The motor drive device 101 is supplied with alternating-current power by the alternating-current power supply 1 and rotates the motor 500b. With the rotation of the motor 500b, the compression element 504 compresses the refrigerant to enable the refrigerant to circulate in the refrigeration cycle unit 506.

The motor drive device according to the second embodiment is configured to include the direct-current power supply device according to the first embodiment. Therefore, applying the motor drive device according to the second embodiment to the product such as the blower, the compressor, or the air conditioner enables the product to have the effects explained in the first embodiment.

The above configurations illustrated in the embodiments are illustrative of contents of the present invention, can be combined with other techniques that are publicly known and can be partly omitted or changed without departing from the gist of the present invention.

The invention claimed is:

1. A direct-current power supply device comprising:
   a reactor having one end connected to an alternating-current power supply;
   a bridge circuit that converts a first voltage into a direct-current voltage, the bridge circuit being connected to another end of the reactor, the first voltage being an alternating-current output of the alternating-current power supply;
   a capacitor that smoothes a second voltage, the second voltage being a direct-current voltage of the bridge circuit;
   a first current detector that detects a first current flowing as an alternating current between the alternating-current power supply and the bridge circuit;
   a second current detector that detects a second current flowing as a direct current between the bridge circuit and the capacitor;
   a first overcurrent determination unit that determines on a basis of a detected first current value whether or not the first current is an overcurrent; and
   a second overcurrent determination unit that determines on a basis of a detected second current value whether or not the second current is an overcurrent,
   wherein a threshold that the first overcurrent determination unit uses in detecting an overcurrent is smaller than a threshold that the second overcurrent determination unit uses in detecting an overcurrent,
   wherein the bridge circuit stops operating when a determination result of either the first overcurrent determination unit or the second overcurrent determination unit indicates an overcurrent.

2. The direct-current power supply device according to claim 1, wherein
   a detection speed of the second current detector detecting the second current is higher than a detection speed of the first current detector detecting the first current.

3. The direct-current power supply device according to claim 1, wherein
   a current detection delay time of the second current detector that detects the second current is shorter than a current detection delay time of the first current detector that detects the first current.

4. The direct-current power supply device according to claim 1, wherein
   the bridge circuit includes a plurality of switching elements,
   the direct-current power supply device further comprises a drive circuit that drives the plurality of switching elements, and
   the drive circuit stops switching operation of the plurality of switching elements when a determination result of either the first overcurrent determination unit or the second overcurrent determination unit indicates an overcurrent.

5. The direct-current power supply device according to claim 4, wherein
   at least two of the plurality of switching elements include an upper-arm switching element and a lower-arm switching element, and the second overcurrent determination unit detects a short circuit between an upper arm and a lower arm that arises when one of the upper-arm and lower-arm switching elements results in short circuit failure.

6. The direct-current power supply device according to claim 4, wherein
   at least two of the plurality of switching elements are a pair of upper-arm switching elements or a pair of lower-arm switching elements, and the first overcurrent determination unit detects power supply short-circuiting that arises when one of the pair of upper-arm switching elements or one of the pair of lower-arm switching elements results in short circuit failure.

7. The direct-current power supply device according to claim 4, further comprising:
   a first voltage detector that detects the first voltage;
   a second voltage detector that detects a second voltage, the second voltage being a direct-current voltage of the bridge circuit; and
   a controller that controls the bridge circuit on a basis of a detected first voltage value, a detected second voltage value, and the detected first current value, wherein
   the controller stops generating control signals that control the plurality of switching elements when a determination result of either the first overcurrent determination unit or the second overcurrent determination unit indicates an overcurrent.

8. The direct-current power supply device according to claim 4, wherein
   at least one of the plurality of switching elements is made using a wide bandgap semiconductor.

9. The direct-current power supply device according to claim 8, wherein
   the wide bandgap semiconductor is silicon carbide, gallium nitride, gallium oxide, or diamond.

10. A motor drive device comprising:
    the direct-current power supply device according to claim 1; and
    an inverter that converts direct-current power output from the direct-current power supply device into alternating-current power.

11. A blower comprising
    the motor drive device according to claim 10.

12. A compressor comprising
    the motor drive device according to claim 10.

13. An air conditioner comprising
    at least one of the blower including the motor drive device according to claim 10 or the compressor including the motor drive device.

* * * * *